United States Patent [19]

Sakuma

[11] Patent Number: 5,687,380
[45] Date of Patent: Nov. 11, 1997

[54] MACRO SERVICE PROCESSING OF INTERRUPT REQUESTS IN A PROCESSING SYSTEM WHERE A SINGLE INTERRUPT IS GENERATED FOR A PLURALITY OF COMPLETED TRANSACTIONS

[75] Inventor: Hajime Sakuma, Tokyo, Japan

[73] Assignee: NEC Corporation, Japan

[21] Appl. No.: 530,948

[22] Filed: Sep. 20, 1995

[30] Foreign Application Priority Data

Sep. 29, 1994 [JP] Japan .................................... 6-259178

[51] Int. Cl.⁶ .................................................. G06F 13/00
[52] U.S. Cl. .................................................. 395/734
[58] Field of Search ..................................... 395/733–742

[56] References Cited

U.S. PATENT DOCUMENTS

| 4,996,639 | 2/1991 | Ishimoto et al. | 395/375 |
| 5,126,944 | 6/1992 | Sakuma et al. | 364/431.05 |
| 5,163,150 | 11/1992 | Matsushima et al. | 395/734 |
| 5,367,676 | 11/1994 | Katori | 395/600 |

FOREIGN PATENT DOCUMENTS

| 63-118949 | 5/1988 | Japan . | |
| 63-118947 | 10/1988 | Japan | G06F 9/46 |
| 1-48162 | 6/1989 | Japan | G06F 15/06 |
| 1230118 | 9/1989 | Japan . | |

OTHER PUBLICATIONS

"User's Manual of 16-Bit Single Chip Microcomputer μPD78602" Sep. 1992, pp. 10-1 to 10-24.

Primary Examiner—Jack B. Harvey
Assistant Examiner—Sumati Lefkowitz
Attorney, Agent, or Firm—Hayes, Soloway, Hennessey, Groosman & Hage, P.C.

[57] ABSTRACT

A data processing system is provided which includes a central processing unit connected to a memory and a plurality of peripheral units. When a single peripheral request is issued from one of the plurality of peripheral units for a processing which includes a process to be executed a plurality of times, an interrupt control section which holds mode information indicating whether the currently set mode is a Macro Service processing mode, outputs the mode information in response to the peripheral request issued from the peripheral unit. An execution section which is contained in the central processing unit executes the processing while determining whether the process is completed for a predetermined number of cycles in a state suspending at least a program counter and program status word without saving them in the stack, when the mode information indicates the Macro Service processing mode.

18 Claims, 6 Drawing Sheets

MACRO SERVICE PROCESSING OF INTERRUPT REQUESTS IN A PROCESSING SYSTEM WHERE A SINGLE INTERRUPT IS GENERATED FOR A PLURALITY OF COMPLETED TRANSACTIONS

BACKGROUND OF THE INVENTION

1. Field of the Invention

The present invention relates to a data processing system, and more particular, to a data processing system for processing an interrupt request from a peripheral unit based on vector interrupt processing or Macro Service processing.

2. Description of Related Art

There are various conventional methods of processing an interrupt request from a peripheral unit. One of the methods is vector interrupt processing in which the contents of the program counter and program status word are saved in a stack before the processing of the interrupt request and restored after the processing of the interrupt request. Another method is Macro Service processing in which the interrupt request from the peripheral unit is processed without saving the contents of the program counter and program status word in the stack. Therefore, overhead is smaller in Macro Service processing than in vector interrupt processing. Therefore, it is advantageous to utilize Macro Service processing. However, in conventional Macro Service processing, an interrupt service routine including a process to be executed repeatedly cannot be effectively processed.

FIG. 1A is a block diagram of a conventional data processing system constituted as a single chip microcomputer. Referring to FIG. 1A, the conventional data processing system includes a read only memory (ROM) and a random access memory (RAM) built therein and connected to a peripheral unit. More particularly, the conventional data processing system mainly includes an analog-to-digital (A/D) converter 107 as a peripheral unit, another peripheral unit 108, an interrupt request control circuit (INTC) 110 for receiving a processing request 109 from each of the peripheral units 107 and 108, for asynchronously generating an interrupt request 112, and for outputting a mode designation information 111, and a central processing unit (CPU) 100 connected to the above units. The portion surrounded by a dashed line in FIG. 1A corresponds to the CPU 100.

The central processing unit 100 includes an arithmetic and logic unit (ALU) 101, a temporary register 102 which is temporarily used in the operation, a general purpose register 103, the RAM 104 for storing a user program and various data inclusive of Macro Service control words 120 and Macro Service channels 121, a program counter (PC) 105 for indicating an execution address of the user program to be executed and a program status word (PSW) 106 for indicating an execution status of the user program. The conventional data processing system further includes a sequencer 113 for executing a sequence control of the CPU 100 and generating an address, a microprogram ROM 114 for storing various microprograms inclusive of a Macro Service microprogram 140 designated by the address generated by the sequencer 113, an execution section 116 for executing a microprogram read out from the microprogram ROM 114 and an internal bus 115 for interconnecting between the above units.

FIG. 1B is a diagram showing the Macro Service control word 120 in detail. Referring to FIG. 1B, the Macro Service control word 120 includes a channel pointer 122 to a Macro Service channel 121, and a Macro Service command 123 for designating what kind of microprogram is to be executed from among the microprograms stored in the ROM 114. The Macro Service channel 121 includes a memory address 124 for storing an address designating a memory location, a peripheral unit address 125 for storing an address of the peripheral unit, and a Macro Service counter 126 for storing a count for the Macro Service processing to be executed repeatedly.

Next, the operation of the conventional data processing apparatus in a Macro Service processing mode will be described below, taking as an example a processing request from the A/D converter 107.

The internal structure of the A/D converter 107 will be first described with reference to FIG. 3. The A/D converter 107 is connected to the internal bus 115 so that the operation can be instructed by the CPU 100 and the conversion result can be read out by the CPU 100. The A/D converter 107 includes 8 input channels #1 to #8, a multiplexer 30 for selecting one from the input channels #1 to #8, a sampling and holding circuit (SH) 31 for sampling and holding an intermediate voltage value, a resistor series 32 used to determine which of digital values the held voltage value is the closest to, a resultant register 34 for temporarily storing the converted digital value, a buffer group 35 of buffers #1 to #8, and an A/D converter control section 33 for controlling the whole of the A/D converter 107. The content of the resultant register 34 is stored in one of the buffers #1 to #8 corresponding to the selected one of the input channels #1 to #8. The A/D converter control section 33 issues a peripheral request signal. The A/D converter control section 33 and the buffer group 35 are connected to the internal bus 115.

It is now assumed that the peripheral request signal 109 is issued from the A/D converter 107 and the mode designation information 111 from the INTC 110 indicates the Macro Service processing mode. Also, it is assumed that the channel #1 is selected in the A/D converter 107 and the peripheral unit address 125 of the Macro Service channel 121 points to the buffer #1.

Referring to FIG. 3, in the A/D converter 107, an analog voltage of the channel #1 selected by the multiplexer 30 is sampled and held by the SH 31 in response to an instruction of the A/D converter control section 33 to start the A/D conversion. A digital value A/D-converted using the resistor series 132 is temporarily stored in the resultant register 34 and then stored in the buffer #1 which is designated by the A/D converter control section 33. When the A/D conversion is completed by storing the digital data in the buffer #1, the A/D converter control section 33 issues a peripheral request signal 109. Another peripheral request signal 109 is also issued from the other peripheral unit 108 to the INTC 110 in addition to the A/D converter 107. If a plurality of peripheral request signals 109 are issued, the INTC 110 selects one of the plurality of peripheral request signals 109 in accordance with priorities and mask states and issues an interrupt request signal 112 to the sequencer 113. Also, the INTC 110 outputs to the sequencer 113 a mode designation information indicative of whether the currently set mode is either a vector interrupt processing mode or a Macro Service processing mode. When the mode designation information 111 is in a high level, the Macro Service processing mode is designated and wren the mode designation information 111 is in a low level, the vector interrupt processing mode is designated. The mode designation information is set at the start of execution of the program but it can be changed by the program or a microprogram later.

Referring to FIG. 2, when receiving the interrupt request signal 112 from the INTC 110, the sequencer 113 designates the Macro Service microprogram 140 stored in the microprogram ROM 114 in response to the interrupt request signal 112 because the mode designation information 111 indicates that the Macro Service processing mode is designated. The designated Macro Service microprogram 140 is executed by the execution section 116.

When the Macro Service microprogram 140 is executed by the execution section 116, one of the Macro Service control words 120 designated by the Macro Service microprogram 140 is first read out. The Macro Service command 123 read out is interpreted and the control is branched to the processing of the microprogram corresponding to the Macro Service command 123 (step S301).

In the branched processing, the peripheral unit address 125 indicative of the buffer #1 of the A/D converter 107 is read out from the Macro Service channel 121 pointed out to the channel pointer 122 of the Macro Service control word 120 (step S302).

After the digital value is read out from the buffer #1, the address modification of the peripheral unit address 125 is executed in accordance with the designation of the Macro Service command 123 (step S303). More particularly, the peripheral unit address 125 is not changed for the next initiation of the Macro Service microprogram 140 if data is again read out from the buffer #1 corresponding to the channel #1. If data is next read out from the buffer #2 corresponding to the channel #2, the peripheral unit address of the buffer #2 is produced by adding a predetermined value to the peripheral unit address 125.

Next, the digital value read out from the buffer #1 is transferred to a memory location designated by the modified memory address 124. Thereafter, the memory address 124 is modified for next initiation of the Macro Service microprogram 140 (step S304).

Next, the Macro Service counter 126 is decremented by "1" when the data transfer is completed (step S305) and it is checked whether the Macro Service counter 126 is zero (step S306). If the Macro Service counter 126 is not zero, the processing is ended without changing or updating the mode designation information 111, in order to indicate that the Macro Service processing is to be executed again when an interrupt request signal 112 associated with the A/D converter 107 is generated next. If the Macro Service counter 126 is zero, the mode designation information 111 is changed to the low level (step S307) to indicate that the vector interrupt processing is to be executed when an interrupt request signal 112 associated with the A/D converter 107 is generated next, and then the processing is ended.

As described above, the basic Macro Service processing in the conventional data processing system is well known to a person skilled in the art. For instance, a similar description is given in Japanese Laid-Open Patent Disclosure (JP-A-Showa63-118949). The processing in which the conversion result generated by the A/D converter is transferred by the Macro Service processing is disclosed in Japanese Laid-Open Patent Disclosure (JP-A-Heiseil-230118). In JP-A-Heiseil-230118, there is proposed a method in which when an A/D converter having a plurality of channels includes only one buffer, processing apparently corresponding to the plurality of channels is executed on the algorithm of the Macro Service processing. However, since most of recent A/D converters include buffers for the number of channels, the complicated processing proposed in JP-A-Heiseil-230118 is not required.

In various references, including the above-mentioned references, since there is disclosed only the Macro Service counter to indicate that the vector interrupt processing is to be executed after the Macro Service processing is initiated the predetermined number of times, there is inconvenience to the processing of an interrupt request from a peripheral unit. For instance, the A/D converter normally includes a plurality of channels and a plurality of buffers corresponding to the channels and some conversion modes exist in the A/D converter. In one of the conversion modes, a peripheral request signal 109 is issued each time the A/D conversion is completed once, but in another mode, a peripheral request signal 109 is issued when the A/D conversion is completed a plurality of cycles, e.g., four cycles. An example of such a mode is described in the user manual of 16-bit single chip microcomputer μPD78602 commercially available from NEC CORPORATION. In this mode, the processing of the interrupt request is ended with one cycle of data transfer or predetermined processing. Accordingly, the A/D conversion results for the remained three cycles cannot be transferred or processed. In order to transfer the remaining conversion results, the peripheral request signal 109 must be issued three times. In this manner, in the conventional data processing system, the Macro Service processing cannot be used for processing which includes a process to be executed a plurality of times in the mode, and the vector interrupt processing is used in place.

Consider the mode in which a peripheral request signal 109 is issued each time the A/D conversion result of the channel #1 is stored in the buffer #1. In this mode, since the A/D conversion is stopped at the time when the peripheral request signal 109 is issued, a restart instruction needs to be issued to the A/D converter control section 33 to restart the A/D conversion in the A/D converter 107. Accordingly, in such Macro Service processing, after the data transfer from the buffer #1 is completed once, the vector interrupt processing is started and then the processing mode is changed from the vector interrupt processing mode to the Macro Service processing mode during the vector interrupt processing. Subsequently, the restart instruction must be issued to restart the A/D conversion of the channel #1. If this operation is repeated four times, the desired processing can be completed. However, in normal vector interrupt processing, the overhead of a few tens of clock cycles is required to resume from the data transfer processing. Thus, there is a problem of increase of the overhead when the Macro Service processing and the vector interrupt processing are alternately repeated as described above. Also, there is another problem in that since the A/D conversion is intermittently executed, it is impossible to execute the continuous A/D conversion processing plural times for a short time. Therefore, such a data processing system cannot be used depending upon the application.

SUMMARY OF THE INVENTION

An object of the present invention is to provide a method of Macro Service processing an interrupt request associated with processing which includes a process to be executed a plurality of times.

Another object of the present invention is to provide a method of reducing overhead in processing of an interrupt request to widen the application field of Macro Service processing.

Further another object of the present invention is to provide a data processing system for the above method.

In order to achieve an aspect of the present invention, a data processing system is providing which includes a central processing unit connected to a memory and a plurality of peripheral units, one of which issues a single peripheral request for processing a process to be executed a plurality of times. The data processing system includes an interrupt control section which holds mode information indicating whether the currently set mode is a Macro Service processing mode, and outputs the mode information in response to the peripheral request issued from the one peripheral unit. The data processing system further includes an execution section contained in the central processing unit. The execution section executes the processing while determining whether the process is completed for a predetermined number of cycles in a state suspending at least a program counter and program status word without saving in the stack, when the mode information indicates the Macro Service processing mode. The data processing system is constituted as a single chip microcomputer.

The execution section desirably includes a plurality of Macro Service files storing a plurality of Macro Service commands, a plurality of memory addresses, a plurality of peripheral addresses, a plurality of cycle counters and a plurality of Macro Service counters, a microprogram storage section for storing a plurality of microprograms, and a microprogram execution section for executing a first microprogram stored in the microprogram storage means to read out the Macro Service command associated with the peripheral request from the plurality of Macro Service files when the mode information from the interrupt control means indicates the Macro Service processing mode, for executing a second microprogram corresponding to the Macro Service command to perform the processing while determining whether the process has completed the number of cycles prestored in the cycle counter corresponding to the Macro Service command, and for ending the processing associated with the peripheral request after it is determined that the process has completed the prestored number of cycles. Further, the execution section may include a section for decrementing the Macro Service counter corresponding to the peripheral request when the processing associating with peripheral request is ended, for determining whether the macro Service counter is zero, for ending the processing associated with the peripheral request if it is determined that the Macro Service counter is not zero, and ending the processing associated with the peripheral request after changing the mode information into another mode if it is determined that the Macro Service counter is zero.

In order to achieve another aspect of the present invention, a method is provided of processing a processing request issued from a peripheral unit in a central processing unit, comprising the steps of:

determining whether a vector interrupt processing mode or a Macro Service processing mode is set for the processing request;

reading a Macro Service command and cycle count corresponding to the interrupt request in a state suspending at least a program counter and program status word without saving the program counter and the program status word, the number of cycles being stored in the cycle count;

executing a microprogram corresponding to the read Macro Service command to execute processing that includes a process to be executed a plurality of times;

determining whether the process is completed for the cycle count, while executing the second microprogram;

ending the processing associating with the processing request if it is determined that the cycle count is zero.

The processing may include one of a process for transferring data from the peripheral unit to storage locations, a process for transferring data from storage locations to the peripheral unit, a process for transferring data from another peripheral unit to storage locations, a process for transferring data from storage locations to another peripheral unit, a process for obtaining an average of data from the peripheral unit, and a process for obtaining an average of data in the peripheral unit from the central processing unit.

DESCRIPTION OF THE PREFERRED EMBODIMENT

The data processing system according to the present invention will be described in detail with reference to the accompanying drawings.

First, the structure of the data processing system according to the first embodiment of the present invention will be described below.

Figure 1A:
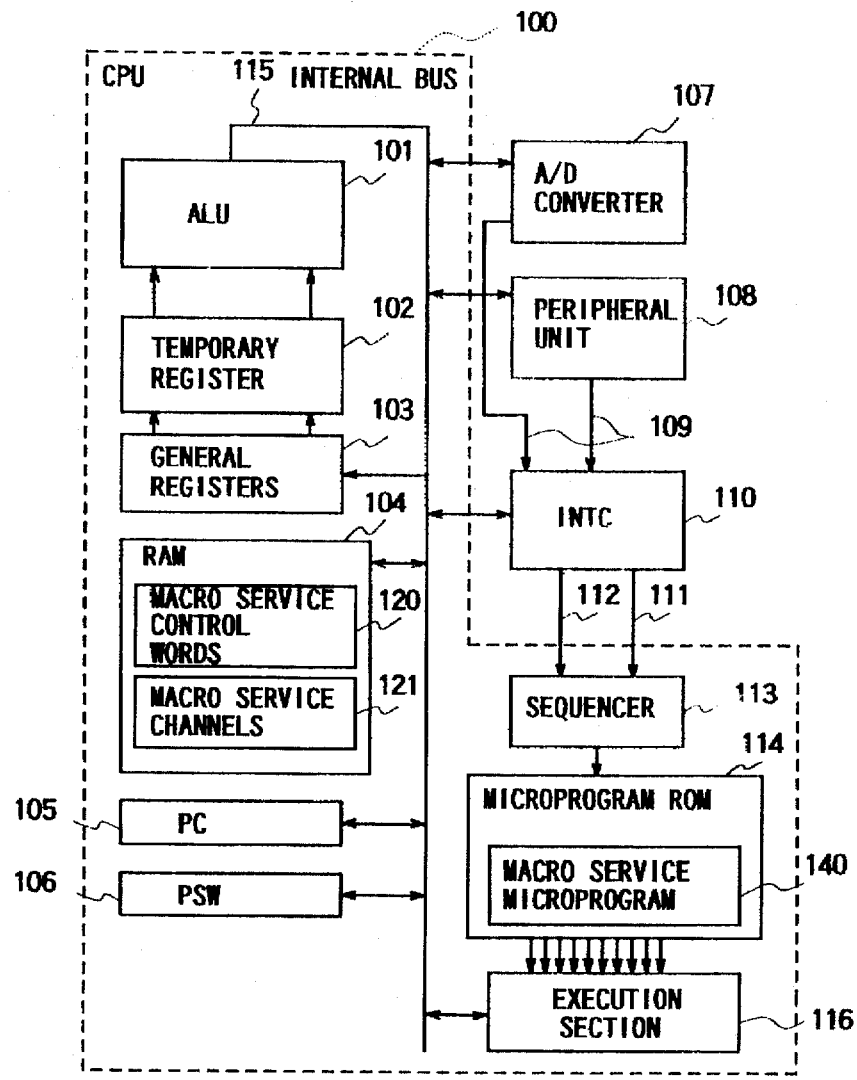
FIG. 1A is a block diagram of a conventional data processing system.
Figure 1B:
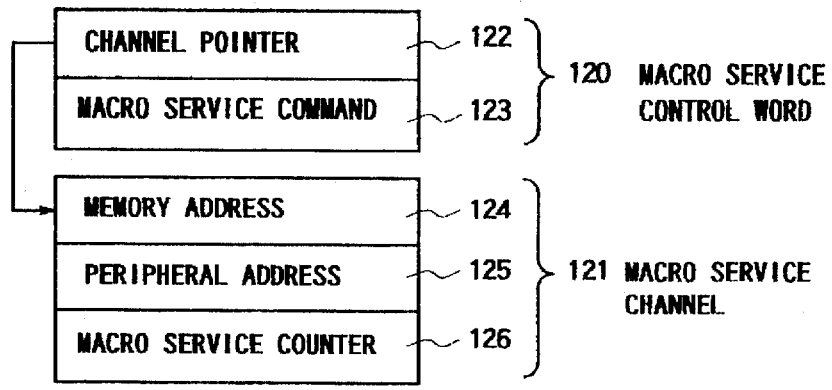
FIG. 1B is a block diagram of a Macro Service control word and a Macro Service channel shown in FIG. 1A.
Figure 2:
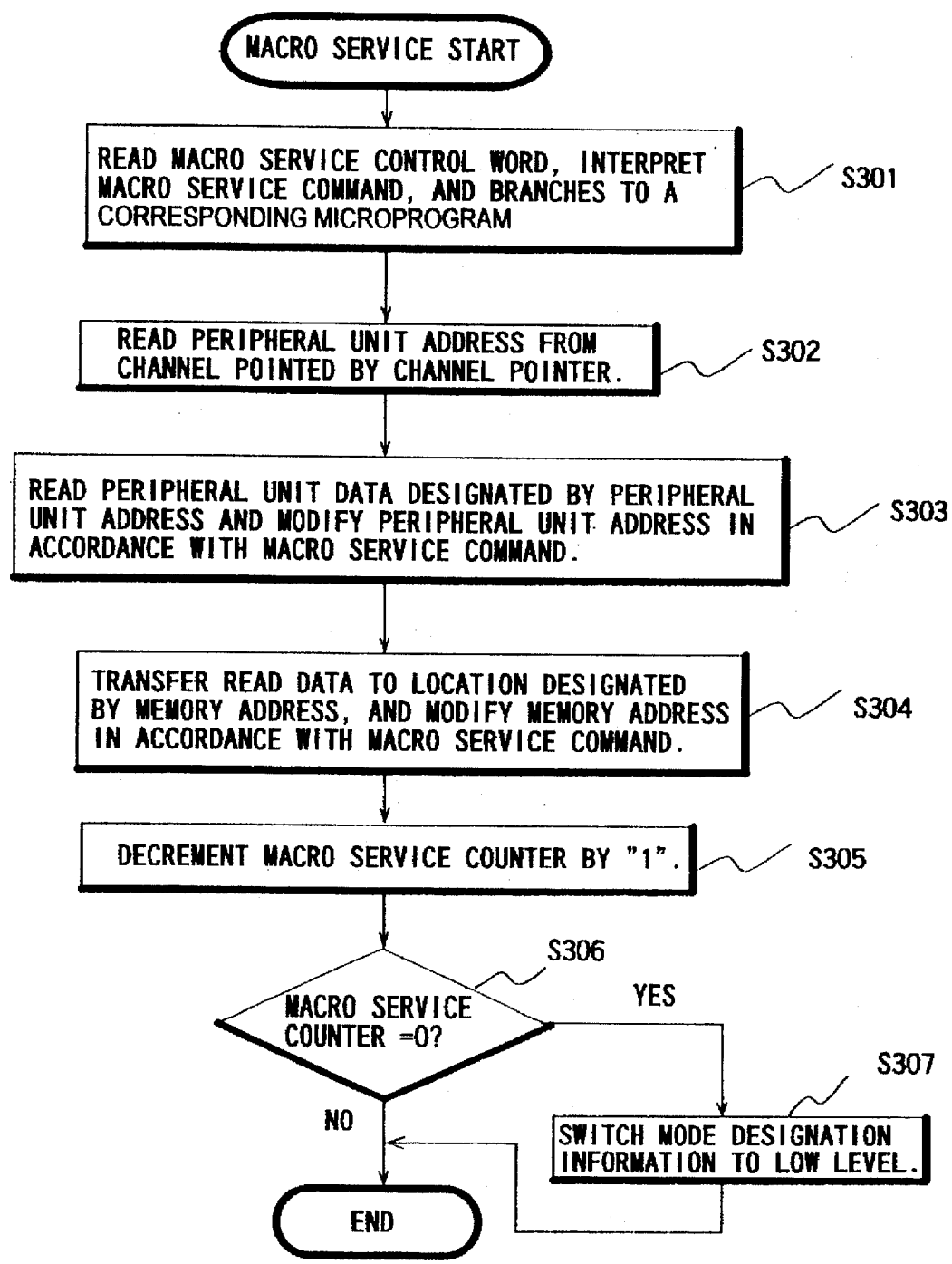
FIG. 2 is a flow chart indicative of the Macro Service processing in the conventional data processing system.
Figure 3:
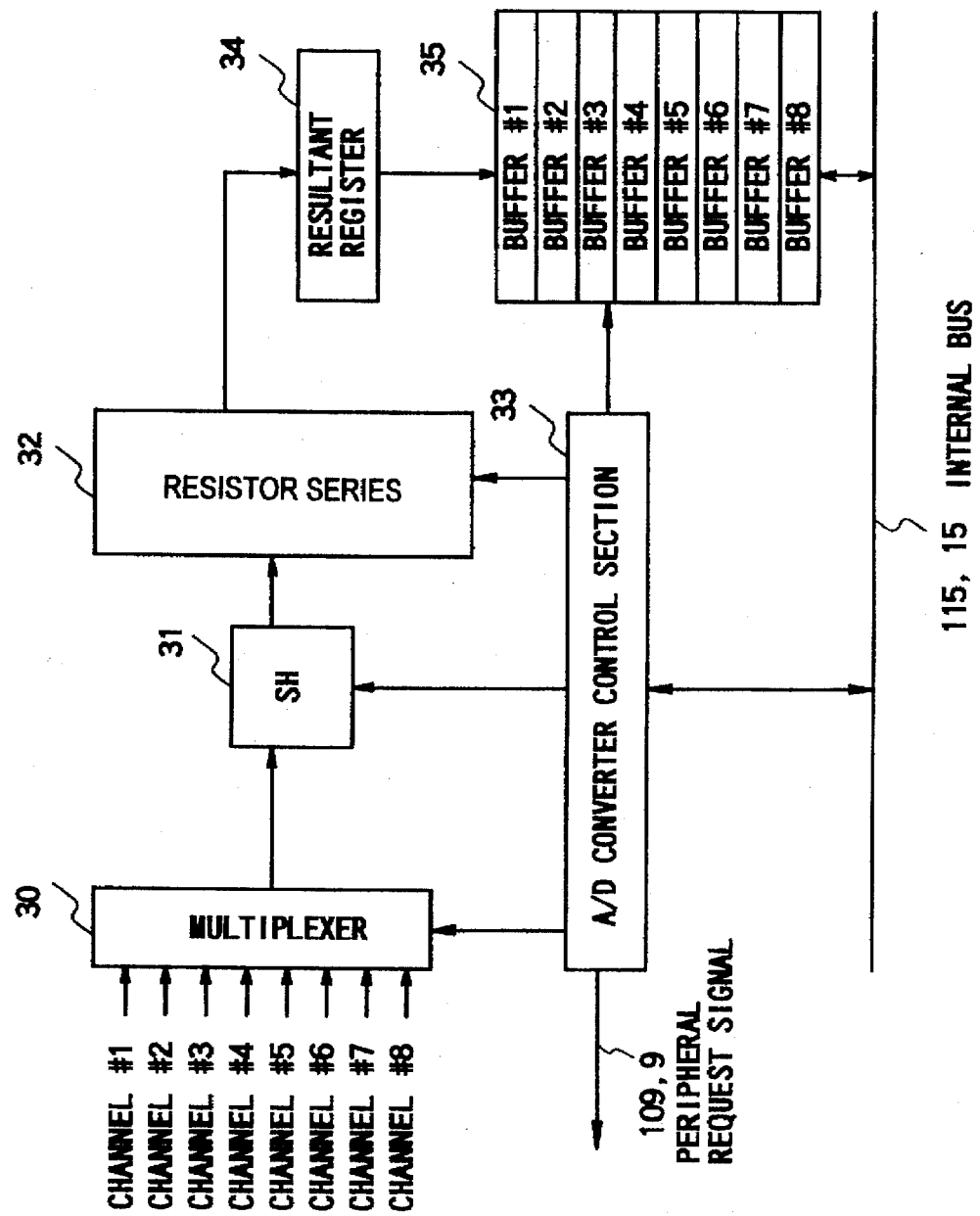
FIG. 3 is a block diagram of an A/D converter.
Figure 4A:
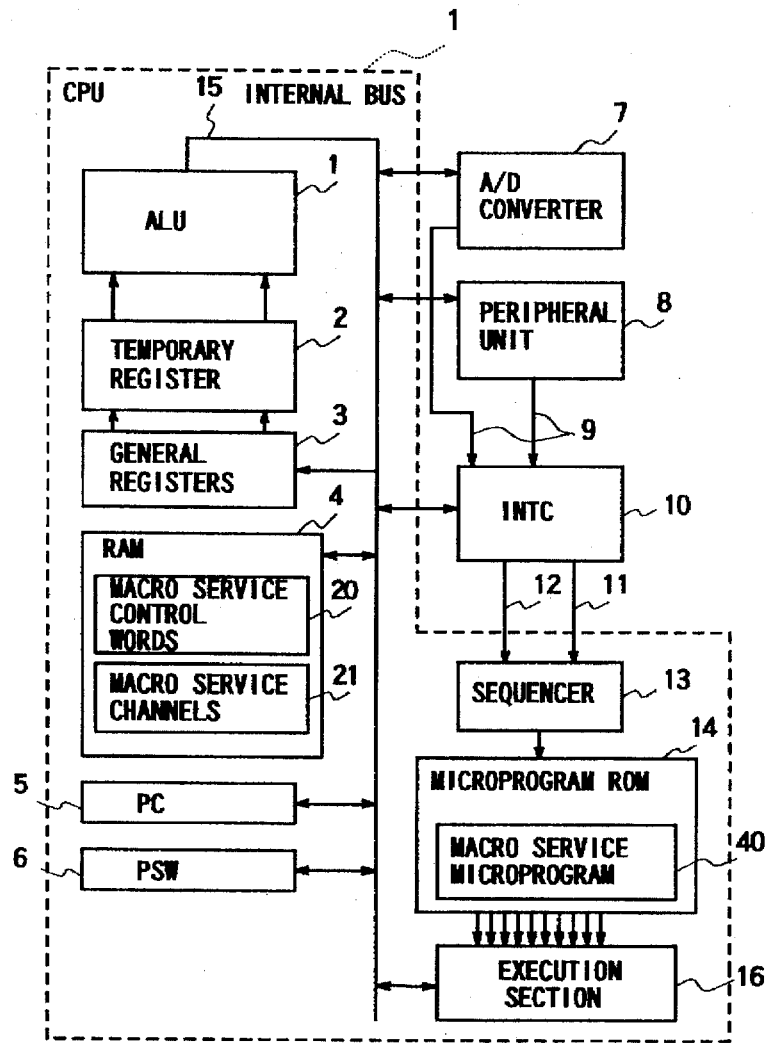
FIG. 4A is a block diagram of a data processing system according to an embodiment of the present invention.

FIG. 4A is a block diagram of the data processing system according to the first embodiment of the present invention. In the first embodiment, the data processing system is realized as a single chip microcomputer, similar to the conventional system. Referring to FIG. 4A, the data processing system mainly includes an analog-to-digital (A/D) converter 7 shown as a peripheral unit in FIG. 3, another peripheral unit 8, an interrupt request control circuit (INTC) for receiving a processing request 9 from each of the peripheral units 7 and 8, for asynchronously generating an interrupt request 12 and for outputting a mode designation information 11, and a central processing unit (CPU) 1 connected to the above sections. The portion surrounded by a dashed line in FIG. 4A corresponds to the CPU 1.

The central processing unit 1 includes an arithmetic and logic unit (ALU) 1, a temporary register 2 which is temporarily used in the operation, a general purpose register 3, the RAM 4 for storing a program and various data including a Macro Service control words 20 and a Macro Service channels 21, a program counter (PC) 5 for indicating an execution address of the program to be executed and a program status word (PSW) 6 for indicating an execution status of the program. The data processing system further includes a sequencer 13 for executing a sequence control of the CPU 1 and generating an address, a microprogram ROM 14 for storing various microprograms including a Macro Service microprogram 40 designated by the address generated by the sequencer 13, an execution section 16 for executing a microprogram read out from the microprogram ROM 14 and an internal bus 15 for interconnecting the above units.

Figure 4B:
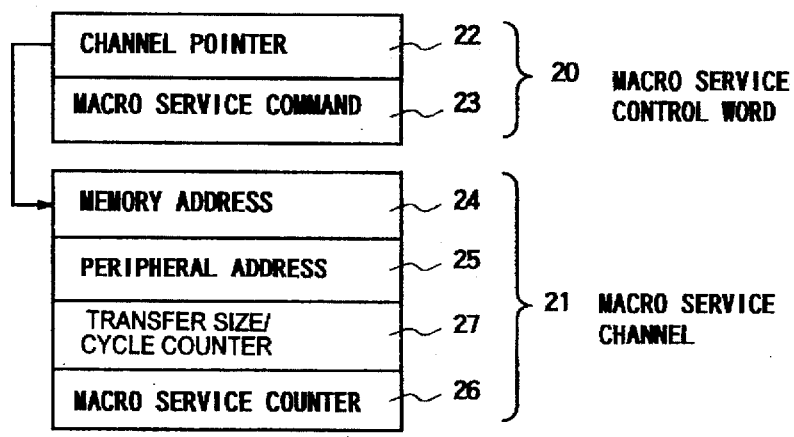
FIG. 4B is a block diagram of a Macro Service control word and a Macro Service channel shown in FIG. 4A.

FIG. 4B is a diagram showing the Macro Service control word 20 in detail. Referring to FIG. 4B, the Macro Service control word 20 includes a channel pointer 22 to a Macro Service channel 21, and a Macro Service command 23 for designating what kind of microprogram is to be executed from among the microprograms stored in the ROM 14. The Macro Service channel 21 includes a memory address 24 for storing an address designating a memory location, a peripheral unit address 25 for storing an address of the peripheral unit, a transfer size 27 for indicating the size of data to be transferred and a Macro Service counter 26 for storing a count for the Macro Service processing to be executed repeatedly.

Next, the operation of the data processing apparatus in a Macro Service processing mode will be described below, taking as an example an interrupt request from the A/D converter 7 shown in FIG. 3. Since the structure of A/D converter 7 was already described, the description is omitted here.

It is now assumed that the peripheral request signal 9 is issued from the A/D converter 7 and the mode designation information 11 indicates the Macro Service processing mode. Also, it is assumed that the channel #1 is selected in the A/D converter 7, the A/D conversion is executed four times to store the conversion results in the buffers #1 to #4, and the peripheral unit address 25 of the Macro Service channel 21 initially points to the buffer #1.

Referring to FIG. 3, in the A/D converter 7, an analog voltage of the channel #1 selected by the multiplexer 30 is sampled and held by the SH 31 in response to an instruction of the A/D converter control section 33. A digital value A/D-converted using the resistor series 132 is temporarily stored in the resultant register 34 and then stored in the buffer #1 which is designated by the A/D converter control section 33. Subsequently, the A/D conversion is repeated three times and the A/D conversion results are stored in the buffers #2 to #4 through the temporary register 34. When the A/D conversion of four cycles is completed, the A/D converter control section 33 issues a peripheral request signal 9. Another peripheral request signal 9 is also issued from the other peripheral unit 8 to the INTC 10 in addition to the A/D converter 7. If a plurality of peripheral request signals 9 are issued, the INTC 10 selects one of the plurality of peripheral request signals 9 in accordance with priorities and mask states and issues an interrupt request signal 12 to the sequencer 13. Also, the INTC 10 outputs to the sequencer 13 mode designation information indicative of whether the currently set mode is either a vector interrupt processing mode or a Macro Service processing mode. When the mode designation information 11 is in a high level, the Macro Service processing mode is designated and when the mode designation information 11 is in a low level, the vector interrupt processing mode is designated. The mode designation information is set at the start of execution of the program but it can be changed by the program or a microprogram later.

Figure 5:
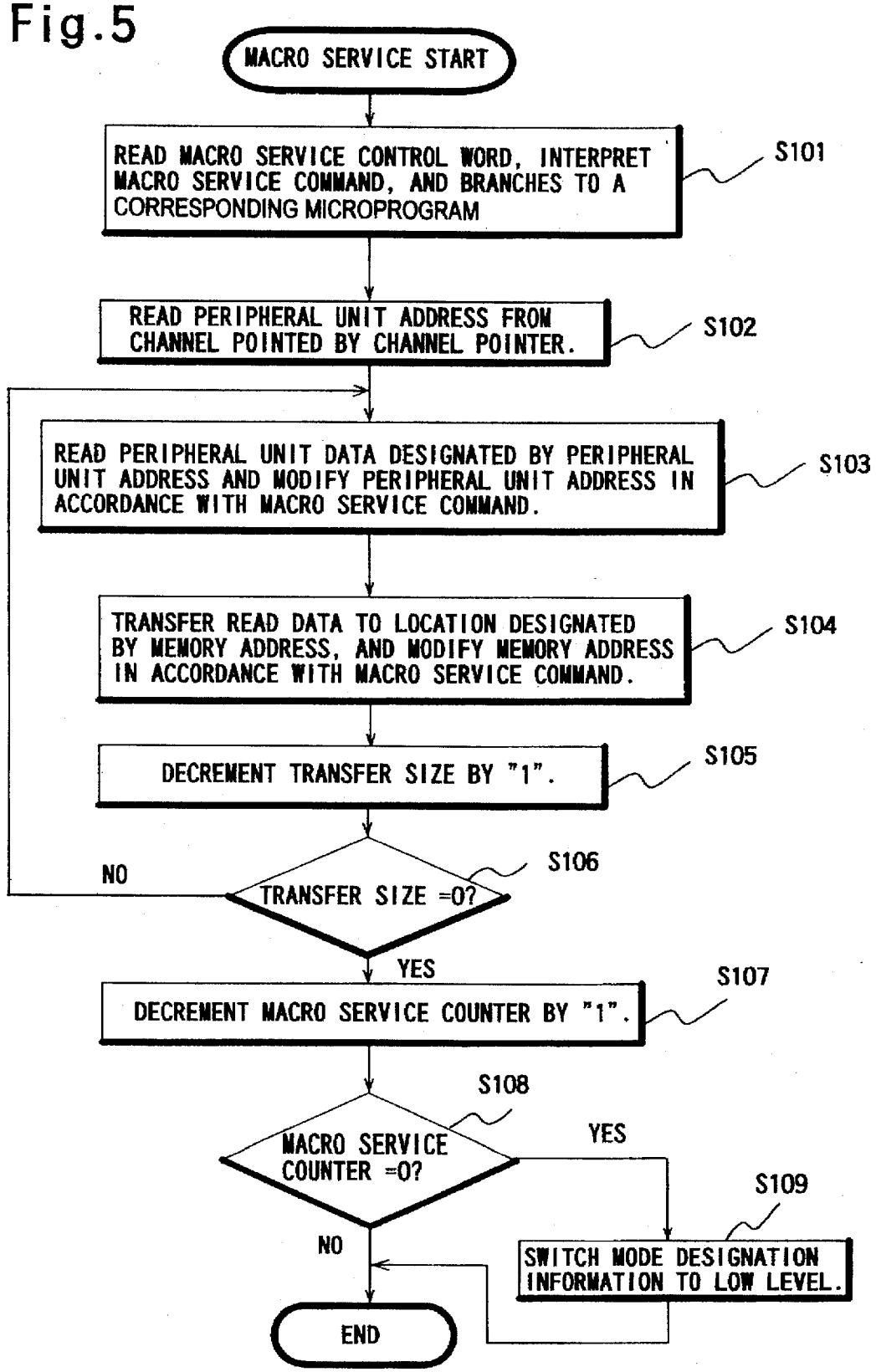
FIG. 5 is a flow chart indicative of the Macro Service processing in the data processing system shown in FIG. 4A.

Referring to FIG. 5, when receiving the interrupt request signal 12 from the INTC 10, the sequencer 13 designates the Macro Service microprogram 40 stored in the microprogram ROM 14 in response to the interrupt request signal 12 because the mode designation information 11 indicates that the Macro Service processing mode is designated. The designated Macro Service microprogram 40 is executed by the execution section 16.

When the Macro Service microprogram 40 is initiated by the execution section 16, the Macro Service control word 20 is first read out and the Macro Service command 23 is interpreted so as to be branched to one of the various types of microprograms in accordance with the Macro Service command 23 (step S101).

In the Macro Service channel 21 pointed to the channel pointer 22, a peripheral unit address 25 is read out (step S102). In this case, it is assumed that the peripheral unit address 25 designates the buffer #1 of the buffer group 35 of the A/D converter 7. The digital data for the A/D conversion of the first cycle is read out from the buffer #1 designated by the peripheral unit address 25 and then the peripheral unit address 25 is updated by adding "1" to the peripheral unit address 25 such that the peripheral unit address 25 designates the buffer #2 (step S103).

Next, the digital data read out from the buffer #1 is transferred to a memory location designated by the memory address 24. Then, the memory address 24 is updated for the data transfer of the digital data for the A/D conversion of the second cycle stored in the buffer #2 (step S104). Subsequently, the transfer size 27 is decremented by "1" (step S105) and it is checked whether or not the transfer size 27 is "0" (step S106). Since the "4" is set in the transfer size 27 as the initial value, the transfer size 27 changes from "4" to "3". Accordingly, control returns to the step S103 to repeat the operation of the steps S103 to S106 for the buffer #2. In this manner, the same operation is repeated for the digital data for the A/D conversion of the third and fourth cycles. Thus, all the digital data are sequentially transferred from the buffers #1 to #4 to memory locations through four cycles of data transfer. When the transfer size 27 reaches "0", the data transfer processing is completed.

Next, the Macro Service counter 26 is decremented by "1" (step S107), and it is checked whether or not the Macro Service counter 26 is "0" (step S108). If the Macro Service counter 26 is not "0", this means that the Macro Service processing is executed again in response to the next interrupt request signal 12. Accordingly, the processing is ended without changing the mode designation signal 11. If the Macro Service counter 26 is "0", this means that the vector interrupt processing is to be executed in response to the next interrupt request signal 12. Accordingly, the mode designation signal 11 is changed to the low level which indicates the vector interrupt processing mode (step S109), and the processing is ended.

As described above, in the first embodiment, the four cycles of A/D conversion and data transfer can be executed in response to a single peripheral request signal 9. Thus, the peripheral request needs not to be processed based on the vector interrupt processing, so that overhead can be reduced. Also, the application field of the Macro Service processing can be widened. Note that the contents of the Macro Service channel may be again set to the same or different values by the execution section 16 through the program or microprogram.

In the above embodiment, the Macro Service processing is executed in response to the peripheral request from the A/D converter 7 and data is transferred from the A/D converter 7 as one peripheral unit to the CPU 1. However, data may be transferred from the CPU 1 to the peripheral unit. Further, the Macro Service processing may be performed to the A/D converter 7 in response to a peripheral request from another peripheral unit 8. The operations in these cases are not described but they would be understood by a person skilled in the art.

Figure 6:
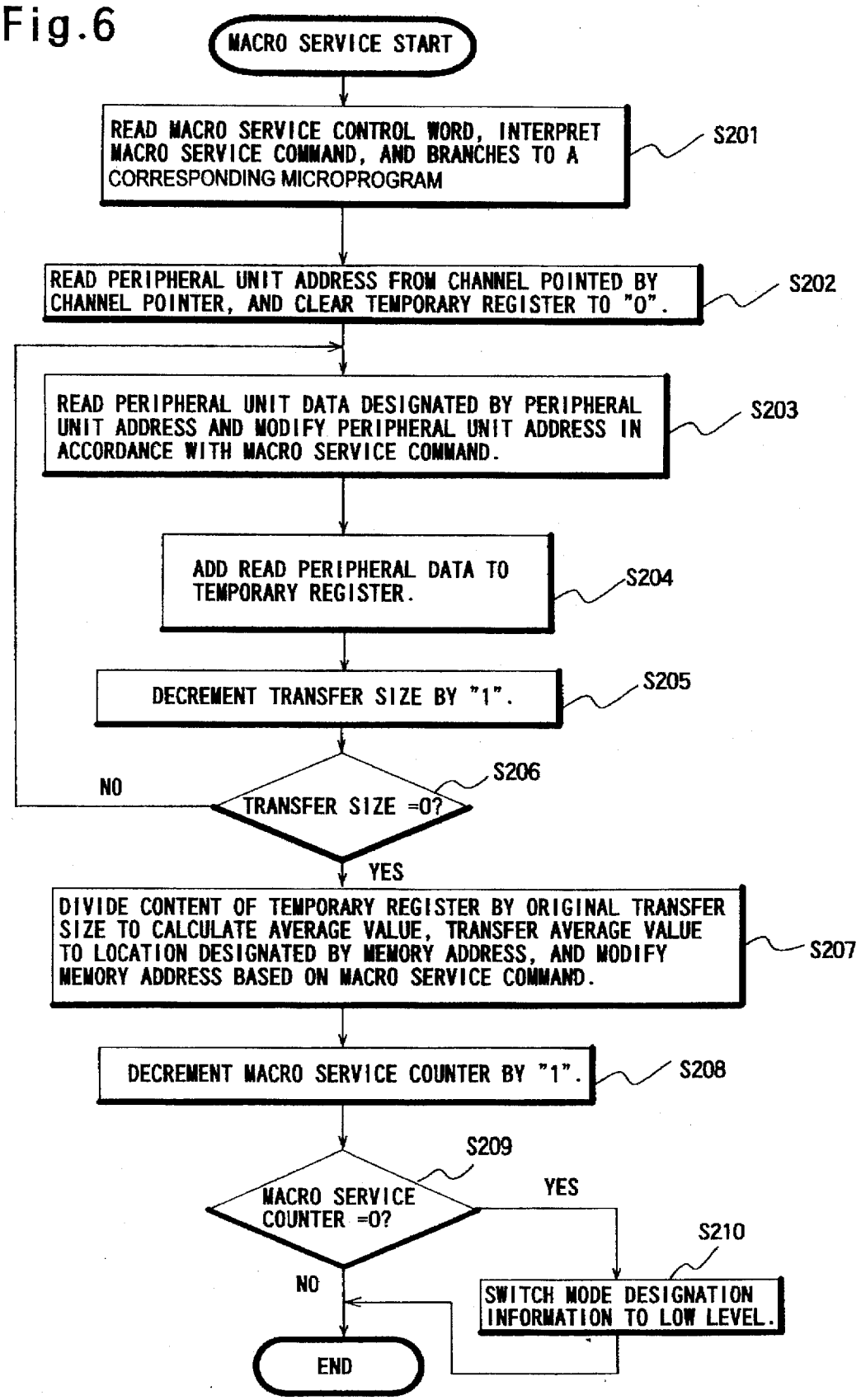
FIG. 6 is a flow chart indicative of the Macro Service processing in the data processing system according to another embodiment of the present invention.

Next, the data processing system according to the second embodiment of the present invention will be described. The structure of the data processing system according to the second embodiment is the same as shown in FIGS. 4A and 4B. However, the operation of the second embodiment is different from that of the first embodiment. Therefore, only the operation will be described below with reference to FIG. 6.

In the A/D converter 7, analog data of the channel #1 selected by the multiplexer 30 is sampled and held four cycles by the SH 31 in response to the instruction from the A/D converter control section 33 and the converted digital data are transferred to and stored in the buffers #1 to #4, which are designated by the A/D converter control section 33, through the resultant register 34 for temporarily storing the data. Thus, after the A/D conversion of four cycles is completed, the A/D converter control section 33 issues the peripheral unit request signal 9. The INTC 10 issues the interrupt request signal 12 to the sequencer 13 in response to the peripheral unit request signal 9. Since the mode designation signal 11 indicates the Macro Service processing mode, the sequencer 13 initiates the Macro Service microprogram 40 stored in the microprogram ROM 14 in response to the interrupt request signal 12.

When the Macro Service microprogram 40 is initiated, the Macro Service control word 20 is first read out and the Macro Service command 23 is interpreted so as to be branched to one of the various types of microprograms in accordance with the Macro Service command 23 (step S201).

A peripheral unit address 25 pointed to the channel pointer 22 is read out from the Macro Service channel 21. At the same time, the temporary register 2 is cleared to "0" (step S202). In this case, it is assumed that the peripheral unit address 25 designates the buffer #1 of the buffer group 35 of the A/D converter 7. The digital data is read out from the buffer #1 designated by the peripheral unit 25 and then the peripheral unit address 25 is updated by adding "1" to the peripheral unit address 25 such that the peripheral unit address 25 designates the buffer #2 (step S203).

Next, the digital data read out from the buffer #1 is transferred to temporary register 2 and added to the contents of the temporary register 2, "0" in this case (step S204). Subsequently, the transfer size 27 is decremented by "1" (step S205) and it is checked whether or not the transfer size 27 is "0" (step S206). Since "4" is set in the transfer size 27 as the initial value, the transfer size 27 changes from "4" to "3". Accordingly, control returns to the step S203 to repeat the operation of the steps S203 to S206 for the buffer #2. Thus, the digital data are sequentially transferred from the buffers #1 to #4 to the temporary register 2 and added to the contents of the temporary register 2. When the transfer size 27 reaches "0", the data transfer processing is completed.

Next, the contents of the temporary register 2, i.e., the sum of four data is divided by the initial value of the transfer size 27 to calculate an average. The average is transferred to a memory location designated by the memory address 24. Then, the memory address 24 is modified in accordance with designation of the Macro Service command (step S207).

Next, the Macro Service counter 26 is decremented by "1" (step S208), and it is checked whether or not the Macro Service counter 26 is "0" (step S209). If the Macro Service counter 26 is not "0", this means that the Macro Service processing is executed again in response to the next interrupt request signal 12. Accordingly, the processing is ended without changing the mode designation signal 11. If the Macro Service counter 26 is "0", this means that the vector interrupt processing is to be executed in response to the next interrupt request signal 12. Accordingly, the mode designation signal 11 is changed to the low level which indicates the vector interrupt processing mode (step S210), and the processing is ended.

In the above embodiments, the description was given taking the A/D converter as an example of the peripheral unit. However, the present invention is not limited to this, but can be applied to peripheral units such as a timer and a serial interface which need to execute a predetermined processing plural times. Further, since the Macro Service control word and the Macro Service channel are separated, the same Macro Service can be used commonly for the plurality of peripheral units.

What is claimed is:

1. A data processing system comprising:
a plurality of peripheral units connected to a central processing unit and a memory, wherein one of said plurality of peripheral units issues a single peripheral request for one process which includes a data transfer process from said one peripheral unit to one of said central processing unit and said memory to be executed a plurality of times;

interrupt control means for holding mode information indicating whether a currently set mode is a Macro Service processing mode, and for outputting said mode information in response to said peripheral request issued from said one peripheral unit; and execution means contained in said central processing unit, for executing said one process while determining when said data transfer process has been executed the plurality of times in a state suspending at least a program counter and program status word without saving the program counter and program status word in a stack, when said mode information indicates the Macro Service processing mode.

2. The data processing system according to claim 1, wherein said execution means includes:
a plurality of Macro Service files storing a plurality of Macro Service commands, a plurality of memory addresses, a plurality of peripheral addresses, and a plurality of cycle counters;

microprogram storage means for storing a plurality of microprograms; and microprogram execution means for executing a first one of said plurality of microprograms stored in said microprogram storage means to read out one of said plurality of Macro Service commands associated with said peripheral request from said plurality of Macro Service files and set data indicative of the plurality of times of execution in one of said plurality of cycle counters corresponding to said Macro Service command when said mode information from said interrupt control means indicates said Macro Service processing mode, for executing a second one of said plurality of microprograms corresponding to said Macro Service command for the plurality of times while determining whether said data transfer process is executed for the plurality of times set in said one cycle counter, and for ending a process associated with said peripheral request after it is determined that said data transfer process is executed for the plurality of times.

3. The data processing system according to claim 2, wherein said one process is to be executed a predetermined number of times, and wherein said execution means further includes:
a plurality of Macro Service counters; and means for decrementing one of said plurality of Macro Service counters corresponding to said peripheral request when said process associated with said peripheral request is ended, for determining whether said Macro Service counter is zero, for waiting for another peripheral request for said one process to re-execute said one process while decrementing said Macro Service counter when it is determined that said one Macro Service counter is not zero, for ending said one process when it is determined that said one Macro Service counter is zero, and for changing the mode information into another mode.

4. The data processing system according to claim 1, wherein said one peripheral unit is an A/D converter.

5. The data processing system according to claim 1, wherein said one process includes means for calculating an average of data transferred in said data transfer process.

6. The data processing system according to claim 1, wherein said data processing system is constituted as a single chip microcomputer.

7. A method of processing a processing request issued from a peripheral unit in a central processing unit, comprising the steps of:

determining whether one of a vector interrupt processing mode and a Macro Service processing mode is set for said processing request;

reading a Macro Service command and cycle count corresponding to said processing request in a state suspending at least a program counter and program status word without saving the program counter and the program status word, wherein a predetermined number of times of repeated execution for a data transfer process included in one process corresponding to said processing request is stored in the cycle count;

executing a microprogram corresponding to the read Macro Service command while determining whether said data transfer process has been repeatedly executed for the cycle count; and ending said process corresponding to the processing request when it is determined that said data transfer process has been repeatedly executed for the cycle count.

8. The method according to claim 7, wherein said data transfer process includes the step of transferring data from said peripheral unit to storage locations.

9. The method according to claim 7, wherein said data transfer process includes the step of transferring data from storage locations to said peripheral unit.

10. The method according to claim 7, wherein said data transfer process includes the step of transferring data from another peripheral unit to storage locations.

11. The method according to claim 7, wherein said data transfer process includes the step of transferring data from storage locations to another peripheral unit.

12. The method according to claim 7, wherein said one process includes the step of obtaining an average of data from said peripheral unit.

13. The method according to claim 7, wherein said one process includes the step of obtaining an average of data in said peripheral unit from said central processing unit.

14. A data processing system comprising:

a central processing unit connected to a memory and a plurality of peripheral units, one of which is for issuing a single peripheral request for one process which includes a data transfer process to be executed a plurality of times;

interrupt control means for holding mode information indicating whether a currently set mode is a Macro Service processing mode, and for outputting said mode information in response to said peripheral request issued from said one peripheral unit; and execution means contained in said central processing unit, for executing said one process while determining whether said data transfer process is executed for the plurality of times in a state suspending at least a program counter and program status word without saving the program counter and program status word in a stack, when the mode information indicates the Macro Service processing mode, for decrementing a Macro Service counter corresponding to said peripheral request when said process associated with said peripheral request is ended, for determining whether said Macro Service counter is zero, for awaiting another peripheral request for said one process to re-execute said one process while decrementing said Macro Service counter when it is determined that said Macro Service counter is not zero, for ending said one process when it is determined that said Macro Service counter is zero, and for changing the mode information to indicate another mode.

15. The data processing system according to claim 14, wherein said execution means includes:

a plurality of Macro Service files storing a plurality of Macro Service commands, a plurality of memory addresses, a plurality of peripheral addresses, a plurality of cycle counters and a plurality of Macro Service counters;

microprogram storage means for storing a plurality of microprograms; and microprogram execution means for executing a first one of said plurality of microprograms stored in said microprogram storage means to read out one of said plurality of Macro Service commands associated with said peripheral request and one of said plurality of cycle counters associated with said peripheral request from said plurality of Macro Service files and to set the plurality of cycles in said one cycle counter when said mode information from said interrupt control means indicates said Macro Service processing mode, for executing a second one of said plurality of microprograms corresponding to said Macro Service command while determining whether said data transfer process is executed for the plurality of times set in said one cycle counter corresponding to said Macro Service command, and for ending said process associated with said peripheral request after it is determined that said data transfer process is executed for the plurality of times.

16. The data processing system according to claim 14, wherein said one process includes the step of transferring data from an A/D converter to a memory, said A/D converter being said one peripheral unit.

17. The data processing system according to claim 14, wherein said one process includes the step of process for transferring data from an A/D converter and calculating an average of said data transferred from said A/D converter.

18. The data processing system according to claim 14, wherein said data processing system is constituted as a single chip microcomputer.

* * * * *